V. F. FRANCK.
PIPE COUPLING.
APPLICATION FILED JUNE 21, 1918.

1,298,687.

Patented Apr. 1, 1919.

WITNESSES

Inventor
Val F. Franck
By Richard B. Owen
Attorney

UNITED STATES PATENT OFFICE.

VAL F. FRANCK, OF LOUISVILLE, KENTUCKY.

PIPE-COUPLING.

1,298,687. Specification of Letters Patent. Patented Apr. 1, 1919.

Application filed June 21, 1918. Serial No. 241,176.

*To all whom it may concern:*

Be it known that I, VAL F. FRANCK, a citizen of the United States, residing at Louisville, in the county of Jefferson and State of Kentucky, have invented certain new and useful Improvements in Pipe-Couplings, of which the following is a specification.

This invention relates to a pipe coupling and has for its principal object the production of efficient means wherein two lengths of pipe may be efficiently connected together.

Another object of this invention is the production of a pipe coupling wherein soft metal flanges may be brought into a binding engagement with each other or in binding engagement with hard metal flanges, thus permitting lengths of soft lead pipe to be connected together and permitting one length of soft lead pipe to be connected with a hard metal joint, for forming a tight connection.

Another object of this invention is the production of a joint wherein the coupling elements are slipped onto the pipes to be connected, whereby the ends of the pipes will be firmly held against displacement.

With these and other objects in view, this invention consists of certain novel combinations, constructions, and arrangement of parts as will be hereinafter fully described and claimed.

Several forms of construction and assembly of the present invention will be described and are illustrated in the accompanying drawing, in which Figure 1 is a vertical section through a pipe and connected ferrule illustrating one form of connection.

Fig. 2 is a longitudinal section through another form of connection as may be used in connection with traps of lavatories, sinks and the like.

Figure 1:
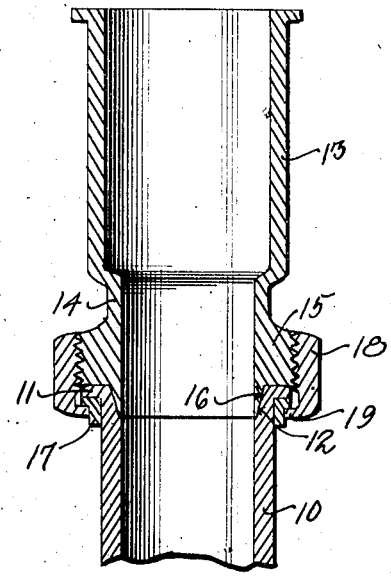

Referring to the accompanying drawing by numerals, wherein several forms of couplings are illustrated, 10 indicates a lead pipe of such device for instance as a trap and this pipe 10 has a soft metal flange 11 thereon, the pipe being beveled at its inner portion as indicated at 12. The metal ferrule 13 has a neck 14, thereon, this neck 14 being provided with a large externally threaded portion 15. The end of the sleeve 14 is beveled as indicated at 16, whereby the end of the sleeve may be inserted to allow the beveled portions thereof to engage the beveled portion 12 of the pipe 10. The enlargement 15 bears upon the soft metal flange 11, thus allowing the two elements to be connected together. The flange ring 17 is carried upon the pipe 10 and bears upon the soft metal flange 11. The internally threaded collar 18 has an annular rib 19 thereon and this collar is positioned over the pipe 10 to allow the rib 19 thereof to engage the flange ring 17. At this time the collar 18 is screwed into engagement with the enlargement 15, of the sleeve 14, thus connecting the ferrule 13 to the pipe 10. It will be noted that the soft flange 11 will be bound between the flange of the ring 17 and the enlargement 15 and therefore will be flattened to form a tight joint.

As above explained, the device shown in Fig. 1 may be connected to a sink, lavatory or the like, thus causing the pipe 10 to be the upper end of the usual trap, not being deemed necessary to be herein illustrated. It will be seen by referring to the description that wiping of the joints is unnecessary, thus saving considerable labor and expense, although the metal connection will positively hold the soft lead flange in position to form a liquid tight joint.

Figure 2:
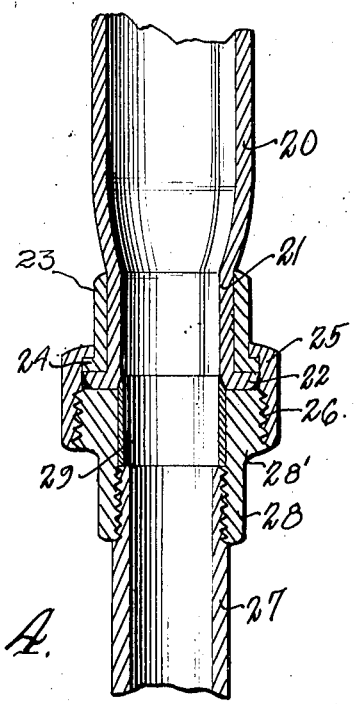

By referring to Fig. 2 another form of the coupling is disclosed wherein the device is illustrated at the opposite end of the trap. The pipe 20 is provided with a reduced portion 21 having a flange 22 formed thereon. A hard metal sleeve 23 is carried upon the reduced portion 21 and has a flange 24 bearing upon the flange 22 of the reduced portion 21. The flange collar 25 is carried by the sleeve 23 and this collar is internally threaded as indicated at 26.

The pipe 27 has a sleeve 28 carried thereon and the sleeve is provided with an enlarged externally threaded portion 28'. The thimble 29 is interposed within the sleeve 28 and extends beyond the enlargement thereof, thus being inserted into the end of the reduced portion 21 of the pipe 20. The soft flange 22 of the pipe 20 will bear upon the inner flange 24 of the sleeve 23 and also in engagement with the enlargement 28.

At this time, the collar 25 may be screwed into engagement with the enlargement 28' of the sleeve 28 and in this way bind the flange 22 of the pipe 20 between the sleeves, thus forming a liquid tight joint.

Figure 3:
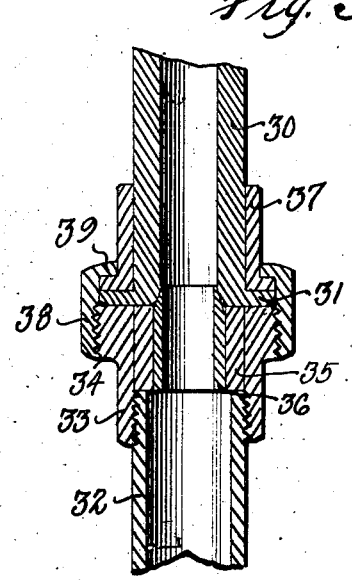
Fig. 3 is a longitudinal section through a part hard metal and soft metal connection.

By referring to Fig. 3 it will be seen that a hard metal pipe is connected to a soft metal pipe. The soft metal pipe 30 has a flange 31 formed thereon. The hard metal pipe 32 has a hard metal sleeve 33 secured thereto and this sleeve 33 is provided with an enlarged externally threaded portion 34. The ring 35 is positioned within the sleeve 33 and engages the end of the pipe 32 and is provided with a thimble 36, which is tapered at its outer end and extends therebeyond, thus permitting the thimble to extend into the pipe 30.

The flanged hard metal sleeve 37 is carried upon the soft metal pipe 30 and it will be seen that this sleeve 37 engages the soft metal flange 31. The internally threaded collar 38 is provided with a rib 39 which is carried by the flange sleeve 37 of the soft metal pipe 30. This collar 38 may be screwed into engagement with the enlargement 34, thus connecting the pipe 32 to the pipe 30. Under such conditions, the soft metal flange 31 will be bound between the sleeve 37 and the enlargement 34 of the sleeve 33, thus pressing the metal to form a liquid tight joint. Thus it will be seen that a connection is made between a soft metal pipe and a hard metal structure consisting of a minimum number of parts, simple in construction and very easily and quickly assembled.

Figure 4:
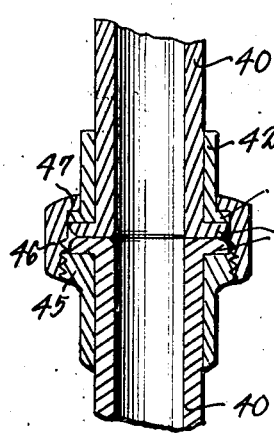
Fig. 4 is a longitudinal section through a connection wherein the flanges of two soft metal pipes are bound in engagement with each other by hard metal connections.

Referring to Fig. 4, it will be seen that the two sections 40 of soft metal pipe are provided with flanges 41 which bear upon each other. The sleeves 42 and 43 are carried upon the pipe 40 and it will be noted that one of the sleeves is provided with a flange 44, while the sleeve 43 is provided with an externally threaded enlargement 45. The collar 46 has a rib 47 carried by the flange 44 of the sleeve 42 and this collar may be screwed into engagement with the externally threaded enlargement 45 of the sleeve 43. Thus it will be seen that the sleeve 43 will be urged toward the sleeve 42 and as these sleeves and collar are of hard metal, it is obvious the soft metal flanges 41 will be bound in firm engagement with each other to form a liquid tight joint.

Figure 5:
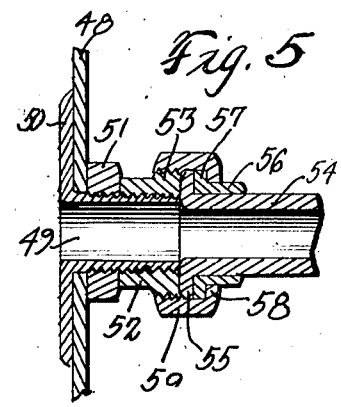
Fig. 5 is a longitudinal section through a connection to be used in combination with traps and the like, illustrating a hard metal and soft metal connection.

In Fig. 5 a portion of a trap is indicated at 48 and the externally threaded pipe 49 extending therefrom has a plate 50 engaging the trap 48 for holding the pipe against displacement. The lock nut 51 is screwed onto the pipe and engages the trap 48, thus holding the pipe against shifting in either direction. The sleeve 52 is screwed into engagement with the pipe 49 and this sleeve 52 has an externally threaded enlargement 53. The soft metal pipe 54 has a flange 55 thereon which bears upon the enlargement 53. The sleeve 56 has a flange 57 bearing upon the flange 55 of the pipe 54. The ribs 58 of the collar 59 bears upon the flange 57 and is screwed into engagement with the externally threaded enlargement 53, thus connecting the soft metal pipe 54 with the pipe 49 extending from the trap 48.

Since the sleeve 56 and the sleeve 52 are of hard metal, it is obvious the soft metal flange will be so firmly pressed between these two structures as to form a liquid tight joint.

From the foregoing description, it will be seen that efficient couplings have been produced which may be employed for not only connecting the flanges of soft metal pipes together but may be employed for connecting a soft metal pipe to a hard metal pipe or for connecting hard pipes together and at the same time the constructions are comparatively simple and thus allow the couplings to be easily assembled with the least amount of labor which in itself off-sets the cost of the metal used in the joints.

The foregoing description and the drawings have reference to what may be considered the preferred or approved forms of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent, is:—

In a pipe coupling, the combination of a soft metal pipe having an annular flange extending outwardly at right angles thereto, the inner portion of said pipe being beveled outwardly contiguous to the base of said flange, a ferrule including a neck having an enlarged externally threaded portion thereon, said neck projecting beyond said enlarged portion and being externally beveled to be reduced toward its end, said neck being engaged with the beveled portion of said pipe, whereupon said flange will bear upon said enlarged portion and terminate slightly short of the threaded portion of said enlarged portion, a hard metal bearing ring having an outwardly extending flange on one end engaging the flange of the soft metal pipe, a collar having threads formed internally and terminating short of one end thereof thus having a slight unobstructed inner surface, a rib formed on said collar at the outer end of the unobstructed surface, said rib engaging said ring, while said collar is being screwed into engagement with the enlarged threaded portion of said neck, thus drawing said ring toward the enlarged threaded portion whereby the ring will be drawn nearer to the beveled surface of said neck to tightly jam the soft metal of said pipe and flange along the beveled portion of said neck, while excess metal of said flange of the soft metal pipe may pass toward the unobstructed surface of said collar thus forming a liquid tight joint.

In testimony whereof I affix my signature in presence of two witnesses.

VAL F. FRANCK.

Witnesses:
W. M. VISER, Jr.
Jos. F. HENKEBEIN.